(12) United States Patent
Lee

(10) Patent No.: US 8,413,073 B2
(45) Date of Patent: Apr. 2, 2013

(54) PROVIDING USER INTERFACE FOR THREE-DIMENSIONAL DISPLAY DEVICE

(75) Inventor: Yonguk Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 178 days.

(21) Appl. No.: 12/843,566

(22) Filed: Jul. 26, 2010

(65) Prior Publication Data
US 2011/0022988 A1 Jan. 27, 2011

Related U.S. Application Data

(60) Provisional application No. 61/228,627, filed on Jul. 27, 2009.

(51) Int. Cl.
*G06F 3/048* (2006.01)

(52) U.S. Cl. . 715/849; 715/848; 715/836; 348/E13.002; 348/E13.026

(58) Field of Classification Search .................. 715/848, 715/757, 834, 836, 850; 345/418–419; 348/E13.002, E13.026
See application file for complete search history.

(56) References Cited

U.S. PATENT DOCUMENTS

| | | | | |
|---|---|---|---|---|
| 4,872,054 A * | 10/1989 | Gray et al. | ..................... | 348/441 |
| 5,270,821 A * | 12/1993 | Samuels | ....................... | 348/552 |
| 6,285,368 B1 * | 9/2001 | Sudo | ............................. | 345/419 |
| 7,581,182 B1 * | 8/2009 | Herz | ............................. | 715/713 |
| 2002/0009137 A1 * | 1/2002 | Nelson et al. | ............... | 375/240.1 |
| 2002/0021261 A1 * | 2/2002 | Werner | ............................... | 345/8 |
| 2003/0146973 A1 * | 8/2003 | Swift et al. | ....................... | 348/51 |
| 2003/0152264 A1 * | 8/2003 | Perkins | .......................... | 382/154 |
| 2004/0218269 A1 * | 11/2004 | Divelbiss et al. | .............. | 359/464 |
| 2005/0117637 A1 * | 6/2005 | Routhier et al. | .......... | 375/240.01 |
| 2006/0080677 A1 * | 4/2006 | Louie | ............................. | 719/323 |
| 2007/0003134 A1 * | 1/2007 | Song et al. | ...................... | 382/154 |
| 2007/0028187 A1 | 2/2007 | Katsuyama | .................... | 715/810 |
| 2008/0226199 A1 * | 9/2008 | Breglio | .......................... | 382/311 |
| 2011/0032330 A1 * | 2/2011 | Kim et al. | ........................ | 348/43 |
| 2012/0019619 A1 * | 1/2012 | Suh et al. | ......................... | 348/43 |

FOREIGN PATENT DOCUMENTS

| | | |
|---|---|---|
| WO | WO 00/46680 A1 | 8/2000 |
| WO | WO 0046680 A1 * | 8/2000 |
| WO | WO 2008/064349 A1 | 5/2008 |
| WO | WO 2008/066907 A1 | 6/2008 |

OTHER PUBLICATIONS

Vetro, A.; , "Frame Compatible Formats for 3D Video Distribution", IEEE International Conference on Image Processing (ICIP), ISSN 1522-4880, pp. 2405-2408, Sep. 2010.*
European Search Report dated Oct. 13, 2010 issued in Application No. 10 00 7789.
Chinese Office Action dated Jan. 29, 2012 issued in Application No. 201010289333.2 (English Translation only).

(Continued)

*Primary Examiner* — Tuyetlien Tran
*Assistant Examiner* — Patrick Ramsey
(74) *Attorney, Agent, or Firm* — KED & Associates, LLP

(57) ABSTRACT

A 3D display device is provided. The 3D display device provides a 3D preview image to be displayed and a control menu for setting various parameters for the 3D preview image to a user and thus enables the user to optimize the 3D parameters before viewing 3D content and view the 3D content.

11 Claims, 12 Drawing Sheets

OTHER PUBLICATIONS

The Software IrfanView3.92, published Aug. 20, 2004, URL:http://www.irfanview.com—two screen shots from internet (http://download.cnet.com/IrfanView/3000-2192_4-10311994.html or (http://www.oldversion.com/download-IrfanView-3.92.html).

European Office Action dated Dec. 23, 2012 issued in Application No. 10 00 7789.

* cited by examiner

PROVIDING USER INTERFACE FOR THREE-DIMENSIONAL DISPLAY DEVICE

CROSS-REFERENCE TO RELATED APPLICATIONS

The present application claims priority under 35 U.S.C. 119 to U.S. Provisional Application No. 61/228,627, filed on Jul. 27, 2009, which is hereby incorporated by reference in its entirety.

BACKGROUND

The present disclosure relates to a Three-Dimensional (3D) display device, and more particularly, to a 3D display device, which provides a 3D preview image to be displayed and a control menu for setting various parameters for the 3D preview image to a user and thus enables the user to optimize the 3D parameters before viewing 3D content and view the 3D content.

Recently, 3D display devices for displaying 3D images are practically used. The 3D display devices may display Two-Dimensional (2D) images and 3D images. The 3D display devices maintain a 2D mode when a 3D mode is not executed, but they display 3D images when the 3 D mode is executed. At this point, for displaying the optimal 3D image, various parameters should be changed according to various environments such as the kinds of 3D input formats, and users may set the parameters. In the related art, however, users inevitably enter into a parameter setting menu through discrete adjustment for setting parameters for 3D images, and they again replay 3D contents for checking 3D images to which adjusted parameters are applied.

In 3D display devices largely requiring the appropriate parameter setting of users, a method is required which may more conveniently set 3D parameters.

SUMMARY

Embodiments provide a 3D display device.

In one embodiment, a Three-Dimensional (3D) display device includes: an image signal processor processing an image signal which includes 3D content; a 3D menu generator generating a 3D control menu; a 3D formatter formatting the 3D content outputted from the image signal processor into a 3D image; a display unit displaying a 3D preview image of the 3D content and the 3D control menu; a user interface receiving a user input for the 3D control menu; and a controller changing and outputting a parameter of the preview image according to the user input In another embodiment, a method of controlling Three-Dimensional (3D) display device includes: receiving an image signal which includes 3D content; formatting the 3D content into a 3D image; generating a 3D control menu; displaying a 3D preview image of the 3D content and the 3D control menu; receiving a user input for the 3D control menu; and changing and outputting a parameter of the preview image according to the user input.

The details of one or more embodiments are set forth in the accompanying drawings and the description below. Other features will be apparent from the description and drawings, and from the claims.

BRIEF DESCRIPTION OF THE DRAWINGS

The accompanying drawings, which are included to provide a further understanding of the invention and are incorporated in and constitute a part of this application, illustrate embodiment(s) and together with the description serve to explain the principle of the invention. In the drawings.

DETAILED DESCRIPTION OF THE EMBODIMENTS

Reference will now be made in detail to the embodiments of the present disclosure, examples of which are illustrated in the accompanying drawings. Wherever possible, the same reference numbers will be used throughout the drawings to refer to the same or like parts.

Hereinafter, the configuration and operation of 3D display device 100 according to embodiments will be described in detail with reference to the accompanying drawings.

Figure 1:
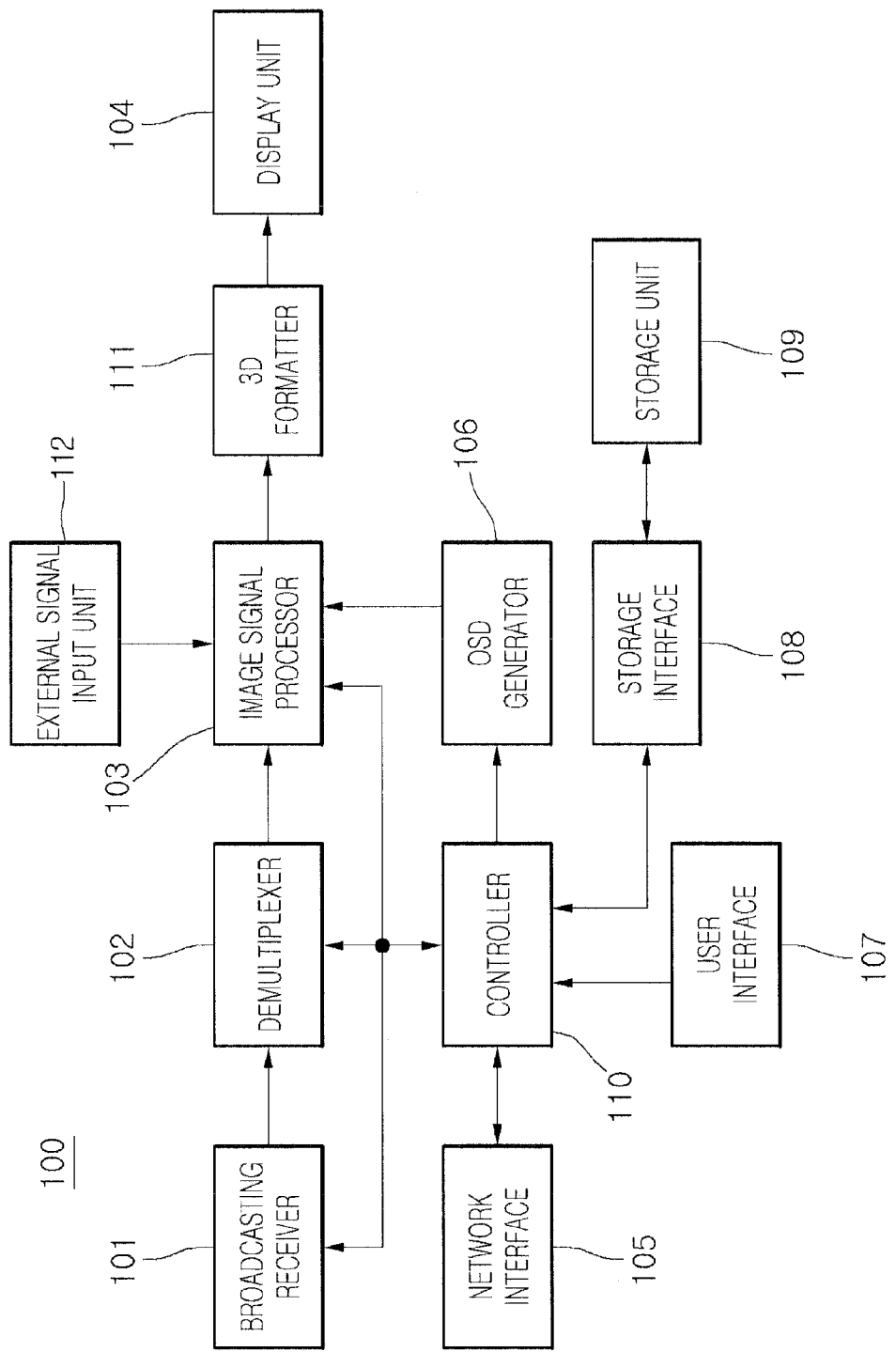
FIG. 1 is a block diagram illustrating a configuration of a 3D display device according to one embodiment.

FIG. 1 is a block diagram illustrating a configuration of a 3D display device 100 according to one embodiment.

Referring to FIG. 1, a 3D display device 100 according one embodiment includes a broadcasting receiver 101, a demultiplexer 102, an image signal processor 103, a display unit 104, a network interface 105, an On-Screen Display (OSD) generator 106, a user interface 107, a storage interface 108, a storage unit 109, an external signal input unit 112, and a controller 110.

Among the elements, the broadcasting receiver 101 and the demultiplexer 102 may configure one broadcasting signal processor that receives a broadcasting signal to extract a signal and transfers the extracted signal to the image signal processor 103.

When 3D content to be displayed is 3D digital broadcasting, a digital broadcasting signal is transmitted in a packeted transport stream form by time-division multiplexing a video signal, an audio signal and additional data.

The broadcasting receiver 101 may include an antenna for receiving a broadcasting signal that is received from the outside. The broadcasting receiver 101 may include a tuner for tuning a broadcasting signal having a frequency band which corresponds to the tuning control signal of the controller 110 according to the tuning control signal, and a demodulator that performs a Vestigial Sideband (VSB) demodulating operation and an error correcting operation for the tuned broadcasting signal of a specific channel to output the signal in a transport stream type.

The broadcasting signal received by the broadcasting receiver 101 is divided into a video signal, an audio signal and all kinds of additional data that are defined as Program and System Information Protocol (PSIP) information, and is transmitted in a bit stream form.

Video data divided through the demultiplexer 102 is processed by the image signal processor 103 and is displayed on the display unit 104.

Herein, the image signal processor 103 includes a scaler changing a Moving Picture Experts Group-2 (MPEG-2) decoder and video data so as to be suitable for a vertical frequency, a resolution and a picture rate based on the output standard of the display unit 104.

A 3D formatter 111 is disposed at the output terminal of the image signal processor 103. The 3D formatter 111 changes an image processed by the image signal processor 108 into a 3D image and transfers the 3D image to the display unit 104. According to embodiments, the OSD generator 106 may include a discrete 3D formatter changing an OSD output into a 3D image.

Herein, the display unit 104 may selectively apply various types of display devices such as Digital Light Processing (DLP), Liquid Crystal Display (LCD) and Plasma Display Panel (PDP). As described below, the display unit 104 displays the 3D preview image of 3D content and a 3D control menu according to the control of the controller 110.

An audio signal is processed by an audio signal processor (not shown) and is outputted to a speaker, and the audio signal processor may include an AC-3 decoder.

Additional data that are included in additional data divided through the demultiplexer 102 are stored in the storage unit 109 through the storage interface 108 to be described below.

The storage device 109 may be implemented with an arbitrary storage medium such as a Hard Disk Drive (HDD) or an Electrically Erasable Programmable Read-Only Memory (EEPROM).

The user interface 107 is a means for receiving a request command from a user, and includes an infrared receiver receiving an infrared signal that is inputted through a remote controller or a local key input unit included in the one side of a panel.

The user interface 107 of the display device 100 may apply an arbitrary user input device such as an infrared remote controller, a gesture-recognizing remote controller including a motion sensor, a joystick or a touch screen.

As described below, a setting input for a 3D parameter is received through the user interface 107.

The network interface 105 receives content or data from a server over a network.

The OSD generator 106 generates a menu picture for receiving the determination signal of the user in an OSD type.

That is, the OSD generator 106 may display information associated with content, which is received through the network interface 105, on the display unit 104.

The external signal input unit 112 is an interface that may receive an input from another player, for example, a Digital Video Disk (DVD) player or a game machine. Another player may be connected to the external signal input unit 112, and multimedia stored in the other player may be outputted to the display unit 104.

The controller 110 controls an overall operation according to a command that is inputted through the user interface 107. Also, the controller 110 generates and displays the preview image and 3D control menu of a 3D image when a 3D mode is executed. The controller 110 may include a 3D menu generator generating a 3D control menu.

Moreover, the controller 110 changes and outputs the parameter of a preview image according to a parameter that has been set by the user.

Figure 2:
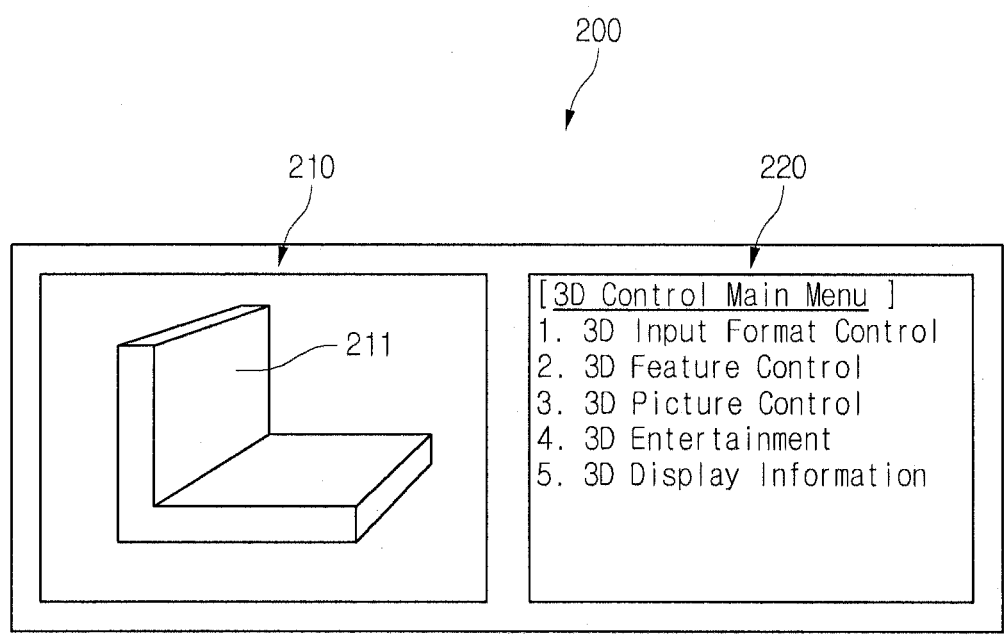
FIG. 2 illustrates a picture when a 3D mode is executed in a 3D display device according to one embodiment.

FIG. 2 illustrates a picture 200 of a 3D display device according to one embodiment. A picture 200 illustrated in FIG. 2 may be an initial picture when the 3D mode is executed in the 3D display device 100. That is, when the user executes the 3D mode in the 2D mode, the picture 200 of FIG. 2 may be displayed.

According to one embodiment, when the 3D mode is executed in the 3D display device 100, a preview image 210 for 3D content to display is displayed in a portion of the picture 200. In FIG. 2, as an example of 3D content, the image of a three-dimensional figure having an L-shape cross-sectional surface is displayed. 3D contents include all contents, which may be displayed as arbitrary 3D images through certain processing, such as 3D movie and 3D animation.

A 3D control menu 220 includes a menu for controlling the picture output parameters of the 3D content. For example, the 3D control menu 220 may include a menu for setting a 3D input format, the parameter setting menu of the 3D formatter 111 and a picture parameter control menu for controlling the brightness and contrast of a picture. The menus will be described below with reference to FIG. 4.

When the user selects one of the menus of the 3D control menu 220 and changes a parameter, a preview image applying the changed parameter is reflected in the preview image 210 and displayed. Accordingly, the user adjusts parameters in the optimal viewing state while watching a preview before displaying 3D content on an entire picture, and can view the 3D content.

For example, when the user selects one of the menus of the 3D control menu 220, for example, a 3D Input Format Control menu, the lower menus of the selected menu are displayed, and the user may select the lower menus to set a parameter.

In the related art, a user executes the 3D mode of a display device, searches menus to adjust the parameter of a 3D image, and moreover, since a parameter setting menu and the 3D image are not displayed at the same time, the user cannot set a parameter while watching the 3D image. According to one embodiment, however, a user may set various 3D parameters later while watching a preview for 3D content.

Figure 3:
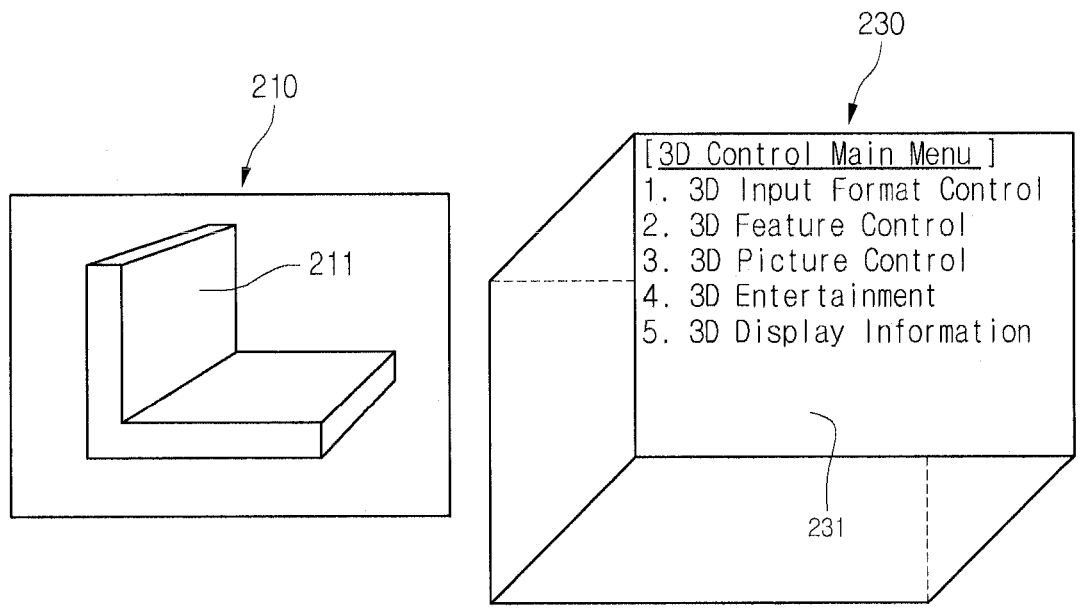
FIG. 3 illustrates a picture when a 3D mode is executed in a 3D display device according to another embodiment.

According to one embodiment, the 3D control menu 220 may be implemented as a 3D polyhedron FIG. 230. As illustrated in FIG. 3, the 3D control menu 220, for example, may be implemented as a regular hexahedron. Lower menus constituting the 3D control menu may be disposed at respective surfaces constituting the 3D polyhedron FIG. 230. The 3D polyhedron FIG. 230 may display the lower menus while being rotated according to the user's input, thereby giving a three-dimensional visual effect.

Figure 4:
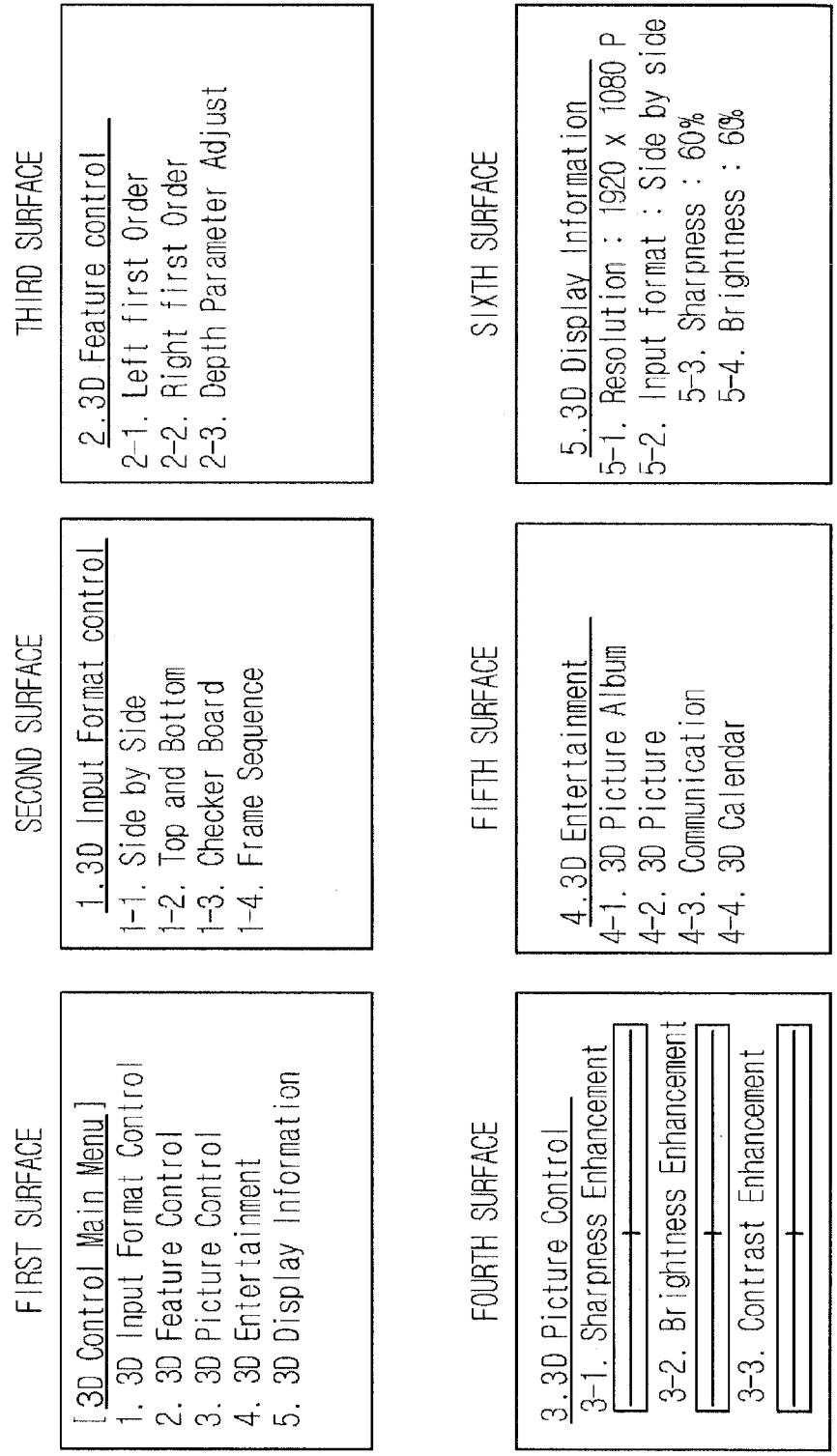
FIG. 4 illustrates sub-menus included in a 3D control menu according to one embodiment.

When it is assumed that the 3D control menu 220 is composed of six sub-menus, as illustrated in FIG. 4, one sub-menu may be allocated to each surface of a 3D polyhedron.

The following description will be made on the assumption of that a polyhedron is a regular hexahedron, but the 3D control menu 220 may be implemented as an arbitrary three-dimensional figure such as a regular hexahedron or a regular octahedron.

As illustrated in FIG. 4, a main menu may be allocated to a first surface, and other sub-menus may be respectively allocated to second to sixth surfaces.

Five sub-menu lists are displayed in the main menu that is allocated to the first surface. The user selects one of the five sub-menu lists, or as described below, when the user rotates a polyhedron figure, the polyhedron figure rotates in order for a surface, to which the second to sixth surfaces are allocated, to face the front of the display device 100.

The 3D Input Format Control menu is a menu for designating the input format of 3D content that is inputted to the display device 100. Various formats of signals inputted to a 3D television (TV) exist, and accurate 3D images may be outputted when the setting of the display device 100 is controlled to be suitable for the format of each input signal.

Figure 5:
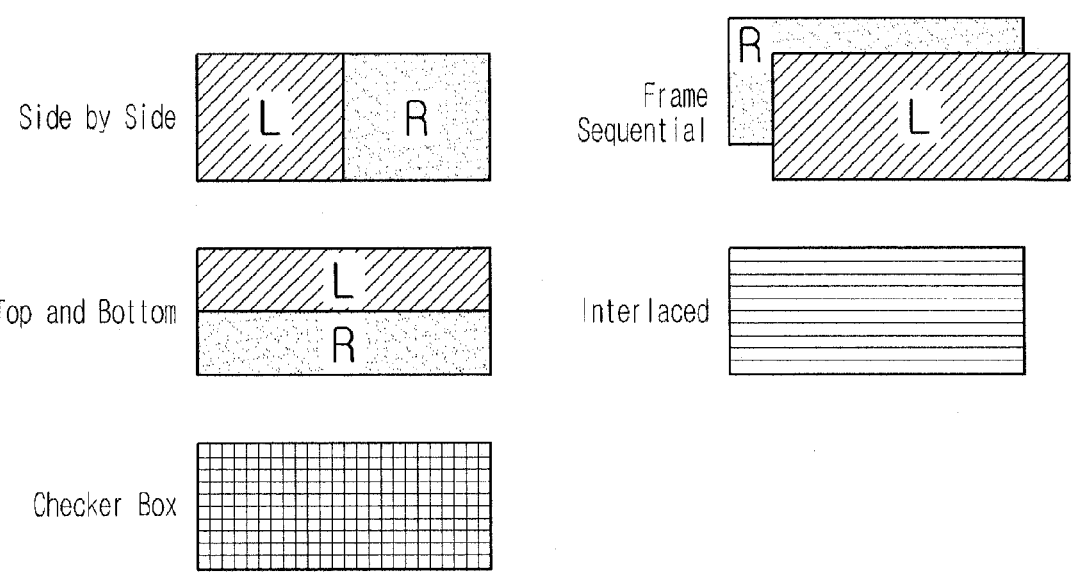
FIG. 5 illustrates various 3D input formats.

Referring to FIG. 5, a Side by Side format is a format where a left-column image and a right-column image are arranged left and right in one frame. A Top and Bottom format is a format where a left-column image and a right-column image are arranged above and below in one frame. A Checker Box format is a format where a left-column image and a right-column image are divided into small cells which are alternately arranged in a checker box shape. A Frame Sequential format is a format where the frame of a left-column image and the frame of a right-column image are alternately provided. An Interlaced format is a format where a left-column image and a right-column image are alternately provided for each scan line similarly to interlace scanning.

A 3D image is received in various formats as described above, and the 3D display device 100 realizes a 3D image through processing based on a corresponding format. At this point, when the 3D display device 100 is set not to be suitable for an input format, a 3D image is not accurately realized, or side effects such as dizziness may occur.

According to one embodiment, when the 3D mode is executed, the user may set a 3D input format suitable for an input format while watching a preview image, through the 3D Input Format Control menu.

The user may control the order in which a left-column image and a right-column image are provided, or it may adjust a depth parameter that is used during an operation where the 3D formatter 111 changes a 2D image into a 3D image, through a 3D Picture Control menu.

The user may control sharpness, brightness and contrast through the 3D Picture Control menu.

A 3D Entertainment menu and a 3D Display Information menu are menus for controlling additional functions instead of 3D picture control. The 3D Entertainment menu provides 3D picture albums, 3D pictures, communication functions and 3D calendars. The 3D Display Information menu provides information such as setting items currently associated with the 3D mode, for example, resolution, current-set input format, sharpness and brightness.

According to one embodiment, menus provided onto a polyhedron may be edited according to the user's request.

As described above, by providing menus related to 3D picture control onto surfaces constituting a polyhedron and displaying the menus together with a preview picture, the user can adjust parameters associated with 3D pictures while watching a preview. Also, the user may place various menus such as menus for controlling additional functions and menus for providing information on surfaces constituting a polyhedron.

Moreover, the number of lower menus may be greater or less than the number of surfaces. That is, in the case of a regular hexahedron, six or more sub-menus may be included in a polyhedron, or six or less sub-menus may be included in a polyhedron. Only menus facing the front are displayed according to the rotation of a polyhedron, and thus menus more than the number of surfaces of the polyhedron may be displayed on the surfaces of the polyhedron. Also, when the number of sub-menus is less than the number of surfaces of a polyhedron, an empty surface may be allocated to residual surfaces in the polyhedron.

According to one embodiment, a polyhedron may be rotated to display other sub-menus according to the user's input.

Figure 6:
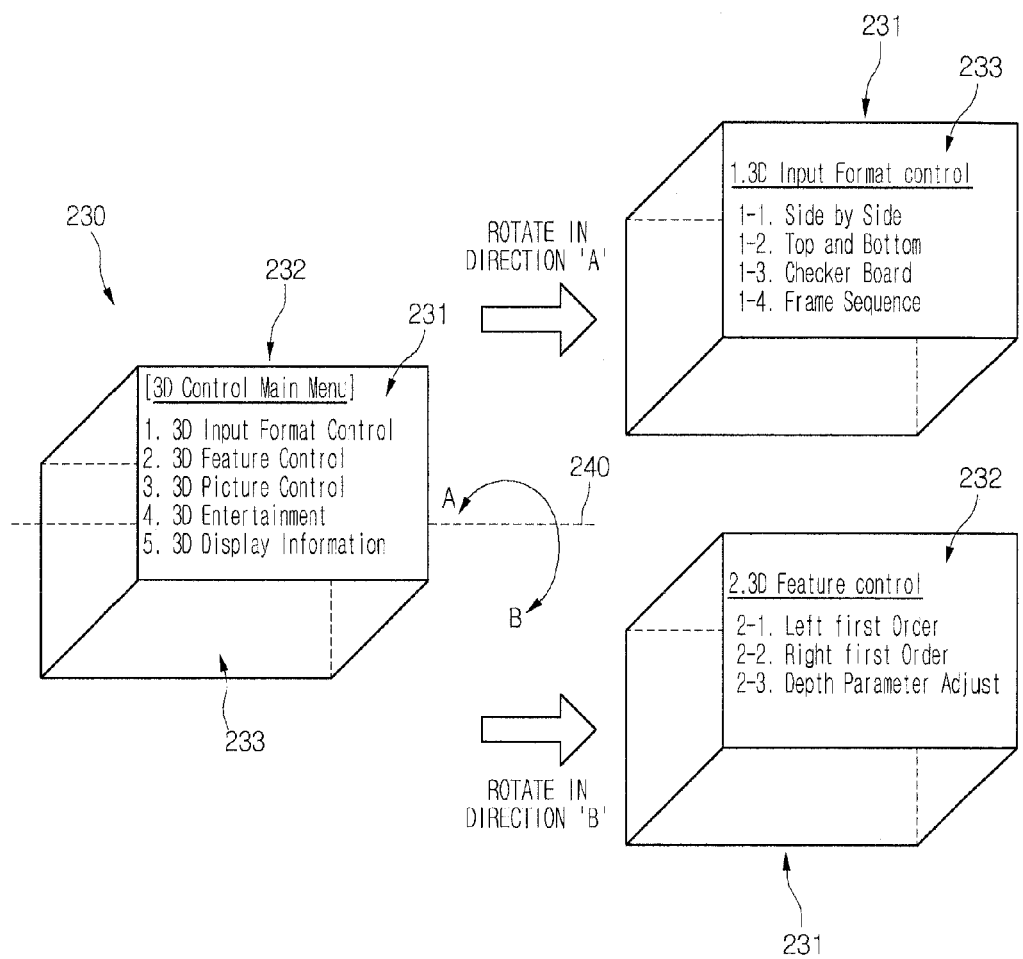
FIGS. 6 and 7 illustrate a method for manipulating a 3D control menu according to one embodiment.

Referring to FIG. 6, it is assumed that the polyhedron 230 is a regular hexahedron, and as illustrated in the left side, a main menu is displayed on a front surface 231 of the display device 100.

When the user rotates the polyhedron 230 in a direction 'A' with respect to an axis 240 using the remote controller, gesture-recognizing remote controller or direction key button of the 3D display device 100, the polyhedron 230 rotates in the direction 'A', and the 3D Input Format Control menu allocated to a bottom surface 233 may be displayed on the front. The front surface 231 displaying the main menu becomes an upper surface by rotation.

Likewise, when the user inputs a command that orders the polyhedron 230 to rotate in a direction 'B' with respect to the axis 240, the polyhedron 230 rotates in the direction 'B', and the 2D Picture Control menu allocated to an upper menu 232 may be displayed on the front. The front surface 231 displaying the main menu becomes a bottom surface by rotation.

Figure 7:
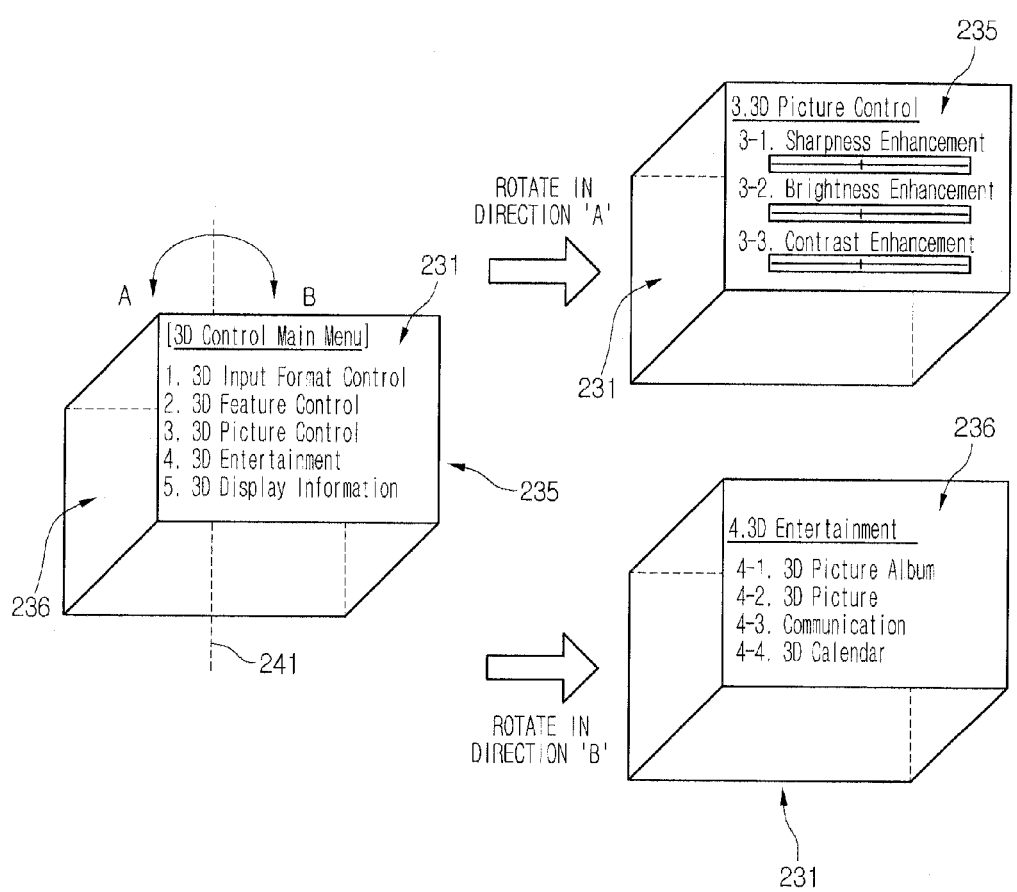

Referring to FIG. 7, when the user inputs a command that orders the polyhedron 230 to rotate in the direction 'A' with respect to an axis 241, the polyhedron 230 rotates in the direction 'A', and thus the 3D Picture Control menu in a right side surface 235 is displayed on the front and the surface 231 displaying the main menu moves to a left side. When the user inputs a command that orders the polyhedron 230 to rotate in the direction 'B' with respect to the axis 241, the polyhedron 230 rotates in the direction 'B', and thus the 3D Entertainment menu in a left side surface is displayed on the front and the surface 231 displaying the main menu moves to a right side.

When the polyhedron 230 rotates, provided may be an animation that makes the polyhedron 230 appear to rotate actually.

A command indicating the rotation of the polyhedron 230 may be inputted through the direction key of remote controller of the 3D display device 100 or an arbitrary user input device such as a gesture-recognizing remote controller for recognizing a user's gesture, a touch screen or a joystick.

Figure 8:
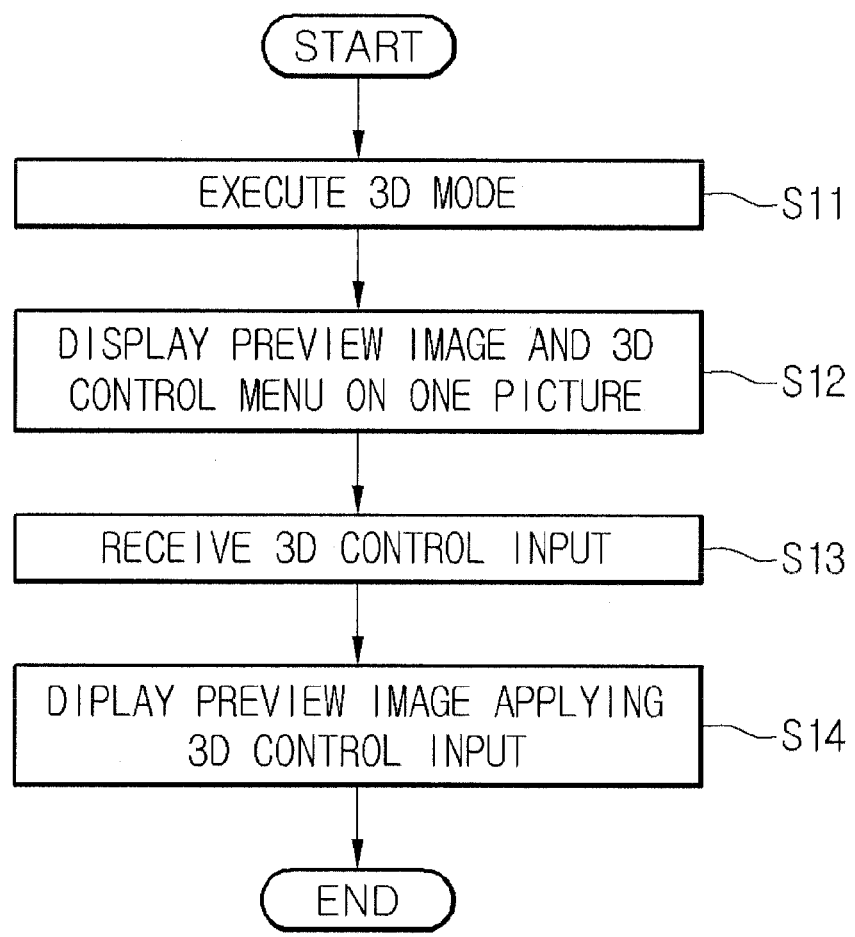
FIG. 8 is a flowchart illustrating a method for controlling a 3D display device according to one embodiment.

FIG. 8 is a flowchart illustrating a method for controlling a 3D display device according to one embodiment.

Referring to FIG. 8, when a user executes the 3D mode of the 3D display device 100 in operation S11, the preview image of 3D content and a 3D control menu are displayed on one picture in operation S12.

When a parameter setting command for a 3D image, for example, 3D input format setting, 3D picture setting or 3D picture setting command described above, is inputted through the 3D control menu in operation S13, a preview image is displayed which applies a parameter inputted to the preview image in operation S14.

For giving a 3D effect to the user, a 3D preview image may also be displayed on a 3D polyhedron like the above-described example.

Figure 9:
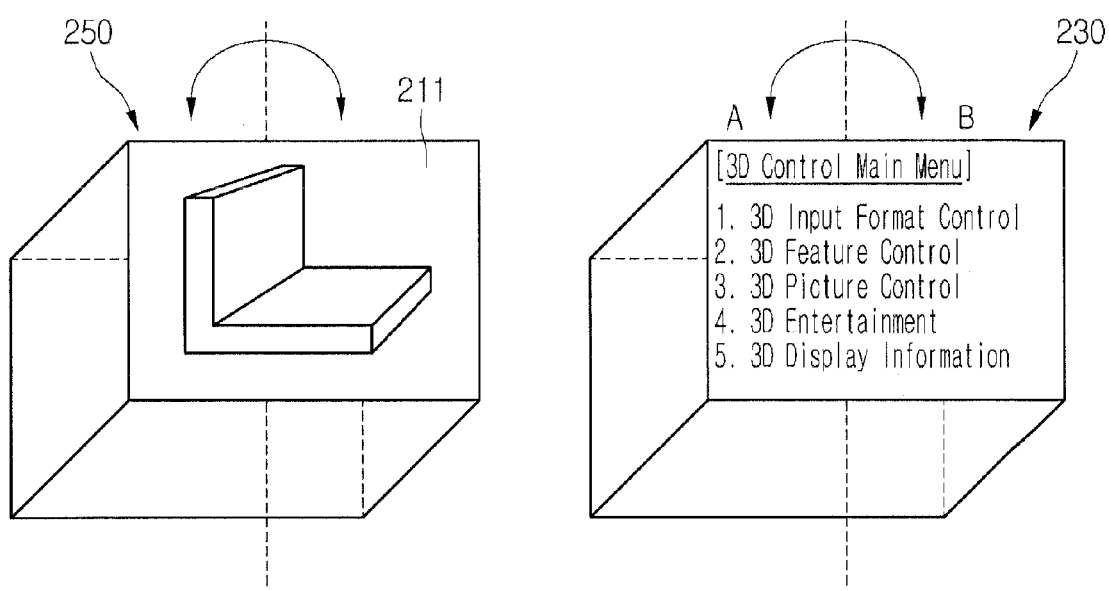
FIGS. 9 and 10 illustrate a picture when a 3D mode is executed in a 3D display device according to another embodiment.

Referring to FIG. 9, a 3D preview image 211 as well as the 3D control menu may be displayed on a polyhedron, for example, a regular hexahedron. Also, when the polyhedron 230 displaying the 3D control menu rotates according to the user's input, the polyhedron 250 displaying the 3D preview image 211 may also rotate together. At this point, although the polyhedron 250 rotates; the 3D preview image 211 is displayed on a surface corresponding to the front surface of the polyhedron.

Figure 10:
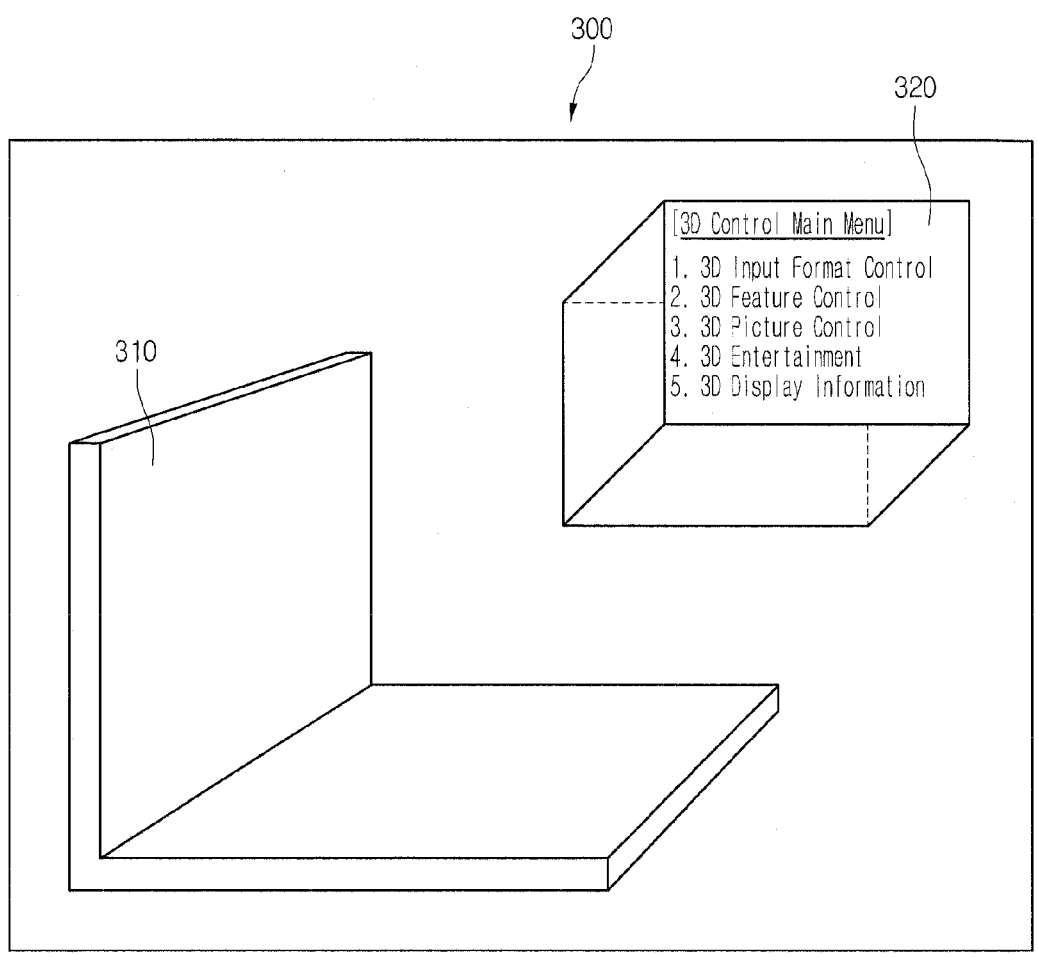

According to one embodiment, when the 3D mode is executed, the preview image of 3D content and the 3D control menu are simultaneously displayed on one picture, and in this point, as illustrated in FIG. 10, a preview image 310 may be displayed on an entire picture and a 3D control menu 320 may be displayed on a portion of the preview image 310. Alternatively, the 3D control menu 320 may be displayed on an entire picture 300, and the preview image 310 may be displayed on a portion of a picture displaying the 3D control menu 320.

According to one embodiment, the user may set the configuration of the 3D control menu. That is, the user may select a menu to be included in the 3D polyhedron.

Figure 11:
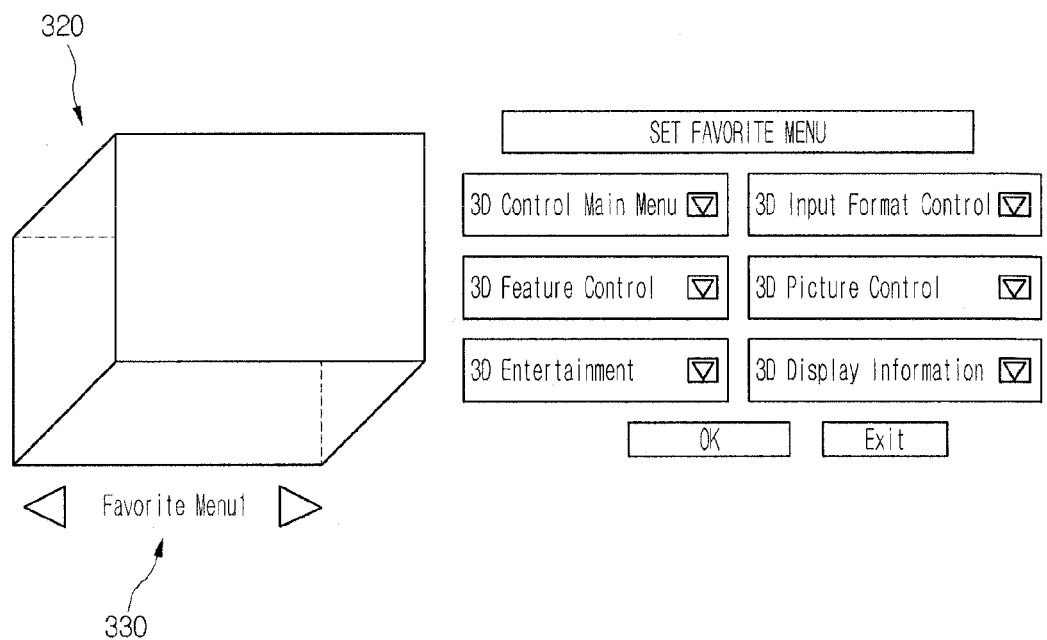
FIGS. 11 and 12 illustrate a method for setting a 3D control menu according to one embodiment.

When the user executes the 3D control menu setting function of the 3D display device 100, the picture of FIG. 11 may be displayed. Referring to FIG. 11, the 3D control menu 320 to be displayed in the executing of the 3D mode is displayed at a left side, and a menu for selecting sub-menus to be included in each surface of the polyhedron of the 3D control menu 320 is displayed at a right side.

A plurality of 3D control menus may exist, and the user may select a menu 330 to select and set another 3D control menu.

Figure 12:
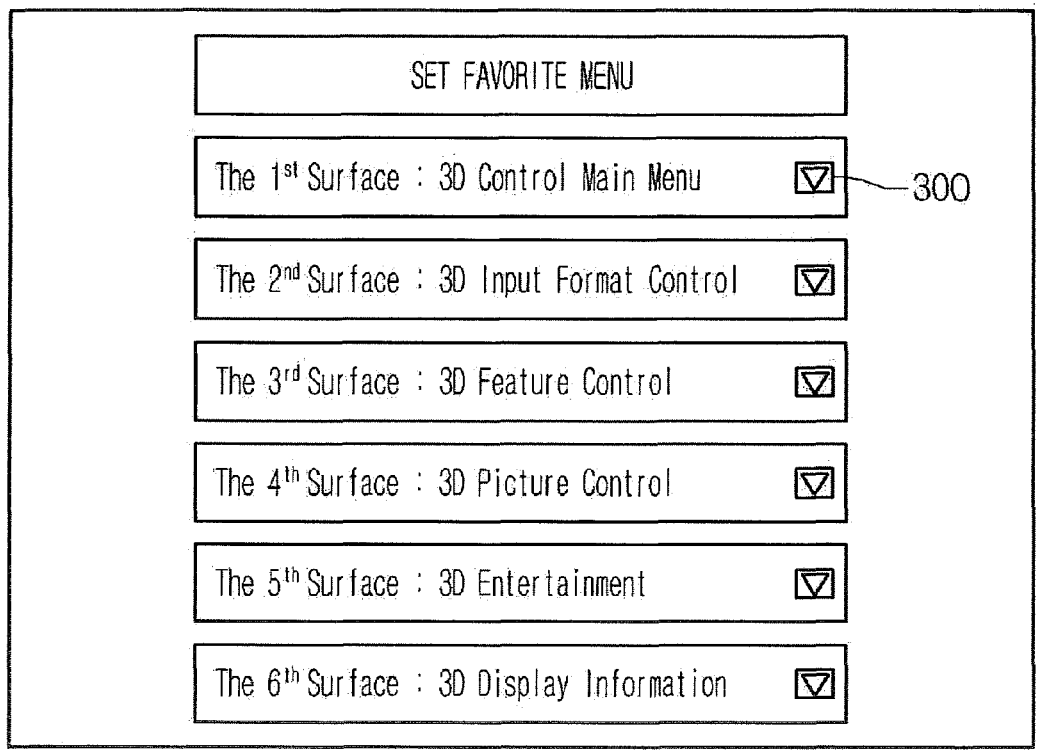

FIG. 12 illustrates a picture for setting a 3D control menu according to another embodiment. When a user executes the 3D control menu setting function of the 3D display device 100, the picture of FIG. 12 is displayed, and the user may set a 3D control menu.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A Three-Dimensional (3D) display device comprising:
an image signal processor for processing an image signal that includes 3D content;
a 3D menu generator for generating a 3D control menu;
a 3D formatter for formatting the 3D content outputted from the image signal processor into a 3D image;
a display unit for simultaneously displaying a 3D preview image of the 3D content and the 3D control menu on different portions of a screen respectively before displaying the content image on the entire screen, when a mode of the 3D display device changes from a two-dimensional (2D) mode to a 3D mode for displaying the 3D content;
a user interface for receiving a user input for the 3D control menu; and
a controller for setting picture output parameters of the 3D content according to the user input by using the displayed 3D control menu and applying the set picture output parameters to the displayed 3D preview image, and
wherein the 3D control menu is implemented as a 3D polyhedron, and the 3D polyhedron to display a lower menu of the 3D control menu while rotating according to the user's input, and wherein the preview image is displayed on a surface of the 3D polyhedron.

2. The 3D display device according to claim 1, wherein the 3D input format is one of a Side by Side format, a Top and Bottom format, a Checker Box format and a Frame Sequential format.

3. The 3D display device according to claim 1, wherein the 3D control menu is set by the user.

4. The 3D display device according to claim 1, wherein the preview image is displayed on an entirety of the display unit, and the 3D control menu is displayed on the preview image.

5. The 3D display device according to claim 1, further comprising a broadcasting signal processor for receiving a broadcasting signal to transfer the broadcasting signal to the image signal processor.

6. A method of controlling a Three-Dimensional (3D) display device, the method comprising:
receiving an image signal which comprises 3D content;
providing a 3D image using the 3D content;
providing a 3D control menu;
simultaneously displaying a 3D preview image of the 3D content and the 3D control menu for setting picture output parameters of the 3D content on different portions of a screen respectively before displaying the content image on the entire screen, when a mode of the 3D display device changes from a two-dimensional (2D) mode to a 3D mode for displaying the 3D content;
receiving a user input for the 3D control menu;
setting the picture output parameters of the 3D content according to the user input by using the displayed 3D control menu; and
applying the set picture output parameters to the displayed 3D preview image, and
wherein the 3D control menu is implemented as a 3D polyhedron, and the 3D polyhedron displays lower menus while being rotated according to the user's input, wherein the preview image is displayed on a surface of the 3D polyhedron.

7. The method according to claim 6, wherein the 3D control menu comprises a 3D input format setting menu of the preview image, a parameter setting menu of the 3D formatter, and a picture parameter control menu.

8. The method according to claim 7, wherein the 3D input format is one of a Side by Side format, a Top and Bottom format, a Checker Box format and a Frame Sequential format.

9. The method according to claim 6, wherein the 3D control menu is set by the user.

10. The method according to claim 6, wherein the preview image is displayed on an entirety of the display unit, and the 3D control menu is displayed on the preview image.

11. The method according to claim 6, further comprising receiving a broadcasting signal to transfer the broadcasting signal to an image signal processor.

* * * * *